(12) United States Patent
Dangel

(10) Patent No.: US 8,210,419 B1
(45) Date of Patent: Jul. 3, 2012

(54) HIDEAWAY DOORS FOR A WORKSTATION

(75) Inventor: Stephen C. Dangel, Bedford, MA (US)

(73) Assignee: Dangel Robots & Machinery Inc., Bedford, MA (US)

( * ) Notice: Subject to any disclaimer, the term of this patent is extended or adjusted under 35 U.S.C. 154(b) by 419 days.

(21) Appl. No.: 12/549,804

(22) Filed: Aug. 28, 2009

(51) Int. Cl.
*B23K 37/00* (2006.01)
*B21J 13/08* (2006.01)

(52) U.S. Cl. ...................................... 228/47.1; 219/158

(58) Field of Classification Search .................... 228/57, 228/43, 44.3, 47.1, 49.1, 49.4, 21; 312/307, 312/306, 139.2, 350; 901/42, 50; 219/125.1, 219/136, 158
See application file for complete search history.

(56) References Cited

U.S. PATENT DOCUMENTS

| | | | | | |
|---|---|---|---|---|---|
| 228,627 | A | * | 6/1880 | Gordon | 312/114 |
| 1,159,859 | A | * | 11/1915 | Muirphy | 160/33 |
| 1,964,578 | A | * | 6/1934 | Hunter | 109/22 |
| 2,099,122 | A | * | 11/1937 | Kreisler | 132/303 |
| 2,891,834 | A | * | 6/1959 | Lake | 312/307 |
| 4,094,546 | A | * | 6/1978 | Glassmeyer et al. | 296/24.4 |
| 4,556,283 | A | * | 12/1985 | Numata et al. | 359/443 |
| 4,756,581 | A | * | 7/1988 | Phillips | 312/183 |
| 4,828,342 | A | * | 5/1989 | Stefan | 312/223.3 |
| 4,890,241 | A | | 12/1989 | Hoffman | |
| 5,161,467 | A | | 11/1992 | Kato | |
| 5,643,477 | A | | 7/1997 | Gullo | |
| 5,921,459 | A | * | 7/1999 | Heraly et al. | 228/45 |
| 6,036,082 | A | | 3/2000 | Caldarone | |
| 6,161,590 | A | | 12/2000 | Wulff | |
| 6,248,977 | B1 | | 6/2001 | Bessler | |
| 6,276,284 | B1 | | 8/2001 | Remley | |
| 6,282,847 | B1 | | 9/2001 | Mangelsen | |
| 6,314,686 | B1 | | 11/2001 | Scherer | |
| 6,553,656 | B1 | | 4/2003 | Kumeth | |
| 6,621,091 | B2 | * | 9/2003 | Pratt et al. | 250/559.33 |
| 6,772,932 | B1 | | 8/2004 | Halstead | |
| 6,787,726 | B2 | | 9/2004 | Thelen | |
| 6,803,541 | B2 | | 10/2004 | Andersen | |
| 6,891,128 | B1 | | 5/2005 | Sidlinger | |
| 7,189,945 | B2 | * | 3/2007 | Starr et al. | 219/392 |
| 7,238,916 | B2 | | 7/2007 | Samodell | |
| 7,287,795 | B1 | * | 10/2007 | Thomas | 296/24.34 |
| 7,290,661 | B1 | * | 11/2007 | DeFino | 206/553 |
| 7,475,954 | B1 | * | 1/2009 | Latunski | 312/297 |
| 7,744,514 | B2 | * | 6/2010 | Rossinger | 483/1 |
| 2010/0072184 | A1 | * | 3/2010 | Osicki | 219/125.1 |

* cited by examiner

Primary Examiner — Kiley Stoner
Assistant Examiner — Carlos Gamino
(74) Attorney, Agent, or Firm — Chapin IP Law, LLC

(57) ABSTRACT

A work station including hide away doors is presented. The work station includes a frame defining a work area, a front door assembly movable within the frame and a front door assembly track disposed within the frame, the front door assembly movable along the front door assembly track. A drive mechanism is disposed along the frame, the drive mechanism in mechanical communication with the front door assembly, the drive mechanism operable to position the front door assembly in a plurality of positions along the front door assembly track. The front door assembly is capable of being positioned beneath a device within the work area thereby allowing full frontal access to the device within the work area and full overhead access to the device within the work area.

15 Claims, 3 Drawing Sheets

HIDEAWAY DOORS FOR A WORKSTATION

BACKGROUND

Robotic welding stations are used to perform welding operations on devices in an automated manner. Robotic welding stations typically include moveable arc flash shields combined with safety barriers. To load parts into a fixture to be welded, an operator needs exclusive, safe access to the work station interior. When the robot is welding, the operator must be excluded from the work station interior. For safety purposes, the work station requires barriers on the four vertical sides to protect personnel from high intensity visible light, ultraviolet rays, infrared rays, and hot weld spatter associated with arc welding. Barriers on the left and right are typically stationary and in place at all times. The barriers on the operator side (front) and robot side (rear) need to be moveable. When the operator barrier is in place blocking the operator's access to the work station, the robot side barrier is moved so it no longer blocks the robot access to the work station. When the robot barrier is in place, the operator side barrier is moved so it no longer blocks the operator access to the work station. The operator side barrier also provides a mechanical separation of the robot work space from the operator work space in addition to radiation and spatter protection.

SUMMARY

Conventional mechanisms, such as those explained above, suffer from a variety of deficiencies. One such deficiency is the front door assembly of the robotic welding station, when positioned to allow operator access, may still provide a barrier as it typically blocks access into the work area by the operator, making it difficult for the operator to load the parts being welded or to remove the part(s) after the welding operation is complete. When the front door assembly is positioned to allow access to the work station by being moved overhead (a garage door type embodiment), overhead access is not possible. Overhead access may be desirable for pieces that require a crane for moving the pieces into and/or out of the work area or to load or remove welding fixtures.

Embodiments of the invention significantly overcome such deficiencies and provide mechanisms and techniques that provide moveable doors used for robotic welding stations in that it uses space under the work area for storing of the front door assembly when access to the work area by an operator is required. As such the operator has access inside the work area and can more easily place pieces to be welded and also remove the welded pieces. This arrangement also allows unfettered overhead access for overhead crane insertion and removal of the welded work piece, and it allows for moveable and stationary panels to contain smoke and fumes generated by the welding process. It also uses different panels for the operator and robot barriers, such that the robot door can be closed before the operator door is opened, offering the greatest separation of the operator and the robot for safety purposes.

The features of the invention, as explained herein, may be employed in devices such as those manufactured by Dangel Robots and Machinery Incorporated of Bedford, Mass.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
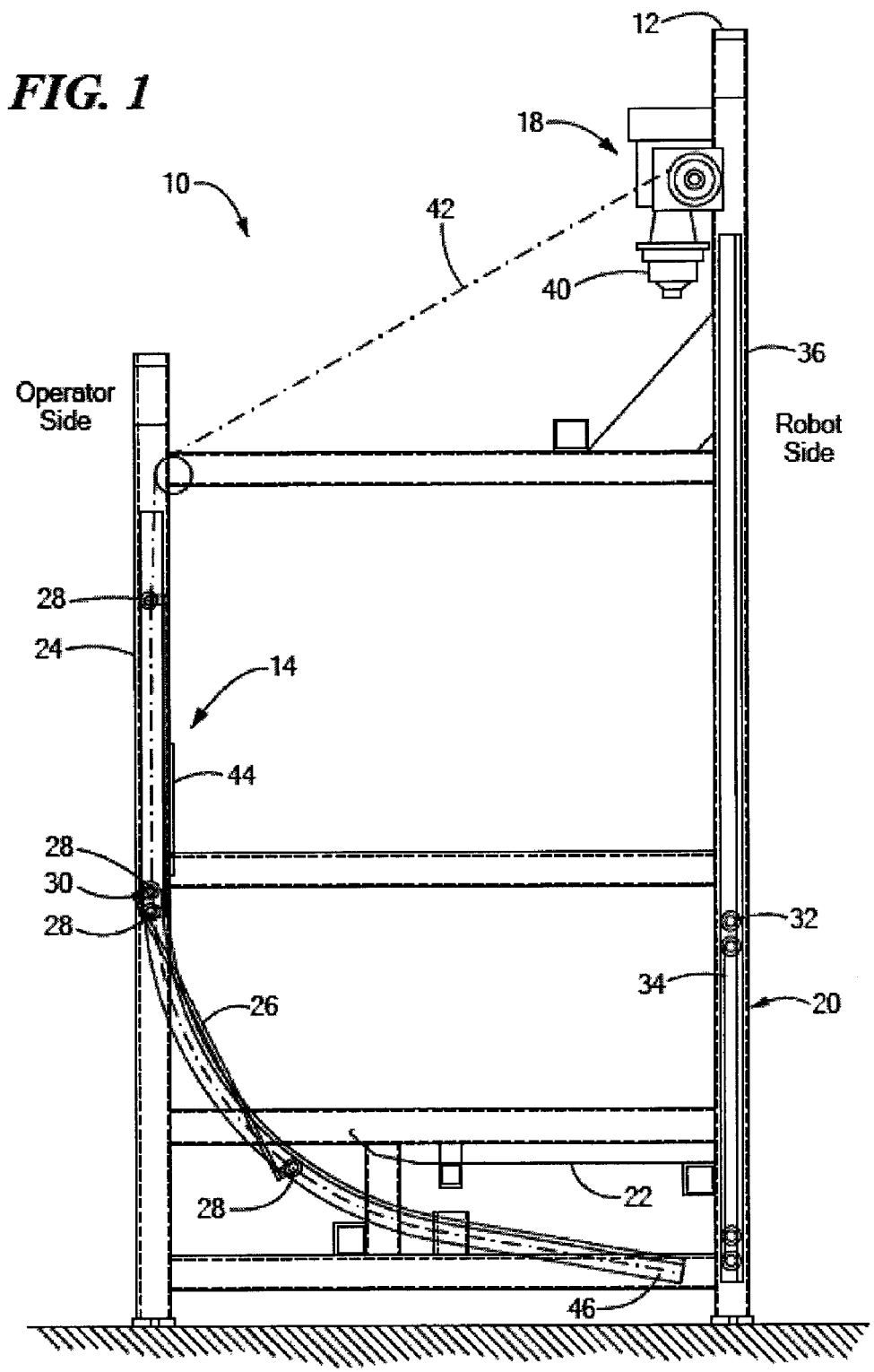
FIG. 1 comprises a mechanical side view drawing of the welding station including hide away doors in accordance with embodiments of the invention.
Figure 2:
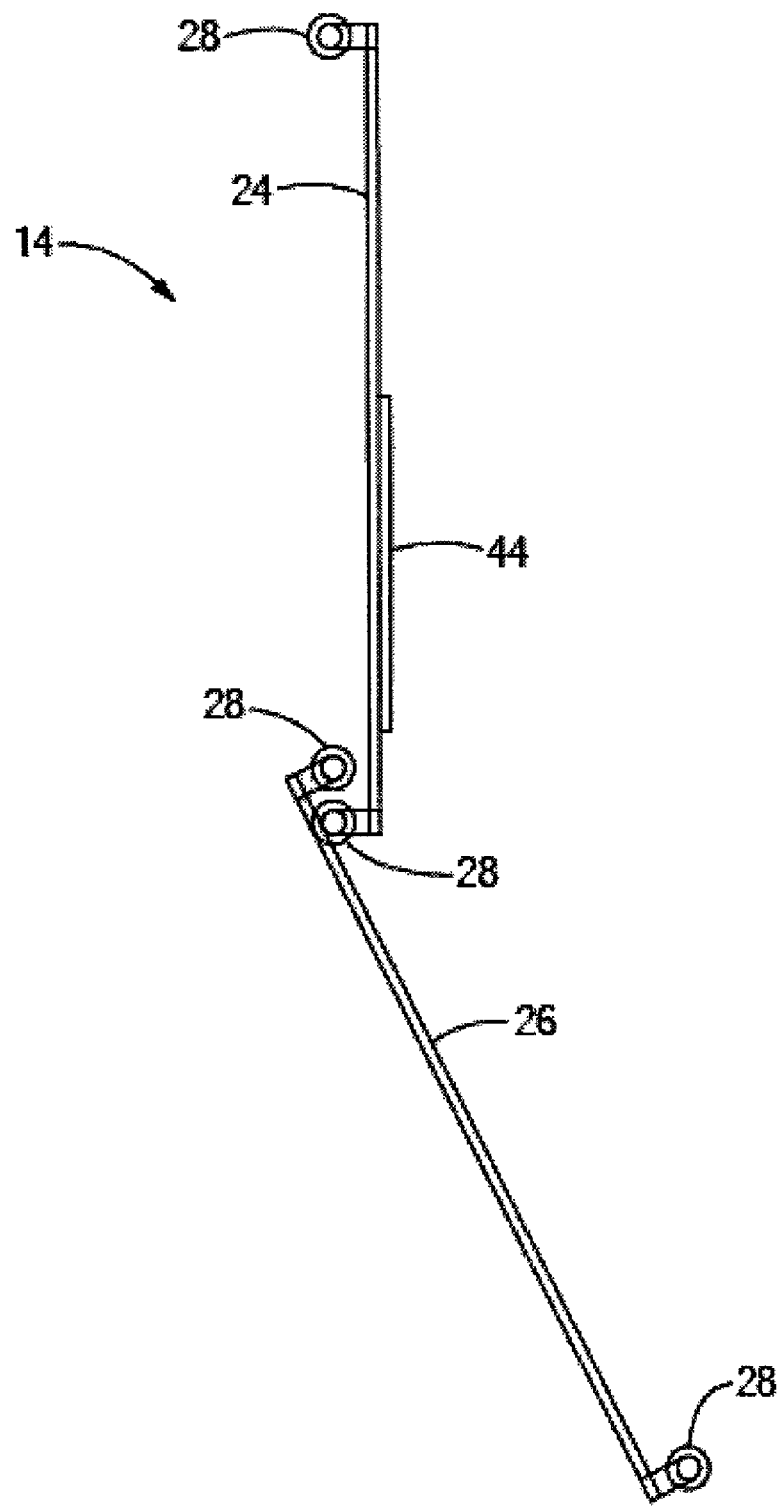
FIG. 2 comprise a mechanical side view drawing of the door assembly in accordance with embodiment of the invention.
Figure 3:
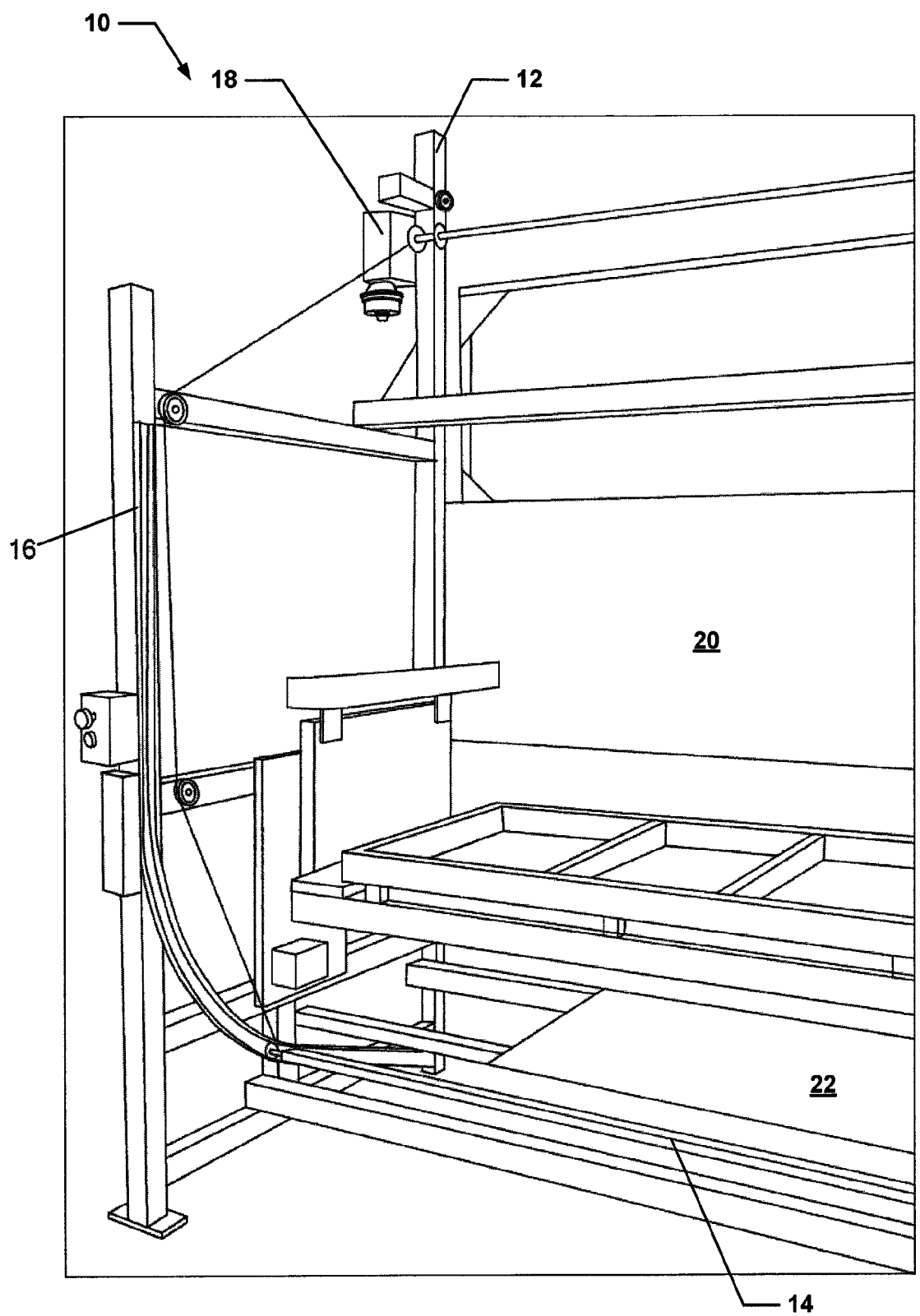
FIG. 3 comprises a view of a robotic welding station incorporating hide away doors in accordance with embodiments of the invention.

Referring now to FIGS. 1-3, a robotic welding station 10 having hide-away doors is shown. The robotic welding station includes a frame 12 which defines a work area. The work area typically contains a welding fixture which is used for placing items to be welded in a particular arrangement and may contain a positioner to turn the fixture.

Robotic welding station 10 also includes a front door assembly 14. Front door assembly 14 in this embodiment includes an upper front door panel 24 and a lower front door panel 26. Preferably, when the front door assembly 14 is in a first position isolating an operator from the work area, a lower section of upper front door panel 24 overlaps an upper section of the lower front door panel 26.

Front door assembly 14 is movable within the work area of frame 12 by way of a drive mechanism 18, a front door assembly track 16 and a plurality of rollers 28. In a first position, the front door assembly 14 is in an upright position, such that the front door assembly isolates the robot's work area from the operator, shielding the operator from arc flash and weld spatter during the welding operation. The front door assembly 14 is movable to a second position under the welding fixture to enhance operator access to the welding fixture. The front door assembly 14 is made of multiple, reinforced door panels, for example an upper door panel 24 and a lower door panel 26 which move down under the welding fixture, wherein the door panels 24 and 26 overlap (nest) and allow the operator to move in close to the welding fixture. The front door assembly 14 provides both arc shielding for welding operations and a mechanical barrier between the operator and the welding robot while allowing the operator more access to the working area without the need to provide a pit in the floor to accept the door panels. This arrangement also allows crane access to the work area and smoke exhaust covering.

The front door assembly 14 is attached to the frame 12 and is guided by rollers 28 in a curved front door assembly track 16. The front door assembly 14 hangs from a drive mechanism 18 which is used to raise and lower the front door assembly 14 within frame 12.

One unique feature of the present invention is that the front door assembly 14 moves down and collapses into a space under the welding fixture, allowing the operator entry into some of the floor space in the work station. By moving down and under the welding fixture, the front door assembly 14 leaves the space above the work station unencumbered by its drive mechanism or barrier storage. The operator entry facilitates access to the welding fixture to remove welded parts and reload the fixture for the next welding cycle. The front door assembly track 16 has a curved section. As the lower door panel 26 of the front door assembly 14 descends it is guided underneath the welding fixture by the curve in the front door assembly track 16 eventually hitting stop 46. The upper door panel 24 of the front door assembly 14 follows the lower door panel 26 of the front door assembly around the curve and nests over the lower door panel 26.

The front door assembly may further include a spacer block 30 between the upper front door panel 24 and the lower front door panel 26 of the front door assembly 14. The spacer block 30 maintains the lower part of front door panel 24 in an overlapping relationship with the upper part of lower door panel 26 which prevents the door panels 24 and 26 from separating from each other in the upright position and allows them to nest when the front door assembly 14 is in the lowered position.

The front door assembly 14 may include at least one window 44 in the upper front door panel 24. The window 44 is preferably provided with a protective material which allows the operator to view the welding operation.

The workstation may further include a splatter shield 22 disposed within the work area. When the front door assembly 14 is positioned beneath the welding fixture in the work area, the front door assembly 14 is beneath the splatter shield 22. This protects the front door assembly 14 when the front door assembly 14 is in the nested position.

The workstation may also include a rear door assembly 20 and a rear door assembly track 36 disposed within the frame 12, wherein the rear door assembly 20 is movable along the rear door assembly track 36 by way of rollers 28. The rear door assembly 20 comprises an upper rear door panel 32 and a lower rear door panel 34, wherein in one position a bottom portion of the upper rear door panel 32 overlaps an upper portion of the lower rear door panel 34, while in another position the upper rear door panel 32 nests along side of the lower rear door panel 34.

When front door assembly 14 is in a position preventing frontal access to the work area, the rear door assembly 20 is in a position allowing rear access to the work area. The operator is isolated by the front door assembly 14 being in the upright position, while the rear door assembly 20 is in a lowered position which allows the robotic welder to weld the pieces in the welding fixture. Similarly, when the front door assembly 14 is in a lowered position allowing frontal access to the welding fixture, the rear door assembly 20 is in a position preventing rear access to the welding fixture, thus the operator can enter the work area without fear of the welding operation taking place which would place the operator at risk.

This positioning of the front door assembly 14 and the rear door assembly 20 can be synchronized by the drive mechanism 18, using a single motor 40 to drive both door assemblies 14 and 20 or by the use of a single drive motor for the front door assembly 14 and a second drive motor for the rear door assembly. With a second drive motor the rear door assembly can be closed before the front door assembly is opened, offering the greatest separation of the operator and the welding robot for safety purposes.

In a particular embodiment the drive mechanism 18 comprises a first motor 40 coupled to a first flexible connection device 42. The first flexible connection device 42 is in mechanical communication with the front door assembly. The first flexible connection device 42 is selected from the group consisting of a chain, a cable, a belt or similar type device as would be known by one of ordinary skill in the art. The drive mechanism 18 further comprises a drive shaft coupled to the first motor 40, and a second flexible connection device coupled to the drive shaft, the second flexible connection device in mechanical communication with the front door assembly 14.

In another particular embodiment the drive mechanism 18 further comprises a second motor coupled to a third and fourth flexible connection devices, the third and fourth flexible connection devices in mechanical communication with the rear door assembly 20.

In a particular example, the work station 10 includes has a main frame 12, guide tracks 16 and 36, a drive mechanism 18, and two roller chains 42, one at each side of the work station 10. A drive shaft extends from the motor drive 40 the full width of the work station 10 with a roller chain sprocket on each end, keyed to the drive shaft. The roller chains 42 are connected at each end to the upper door panels 24 and 32 of the front door assembly 14 and the rear door assembly 20. Each chain 42 passes over a sprocket, in between its connection to the front and rear upper door panels 24 and 32. When the sprockets are turned clockwise, the upper front door panel 24 is lifted, and the rear door assembly 20 lowered. When the sprockets are turned counterclockwise, the upper front door panel 24 is lowered, and the upper rear door panel 32 is lowered. As the upper door panels 24 and 32 of either the front door assembly 14 or rear door assembly 20 is lifted, they eventually engage the lower door panels 26 and 34 at approximately ½ of full stroke, and lift the lower door panels 26 and 34. On lowering, the lower door panels 26 and 34 reaches the bottom stop of the guide tracks 16 and 36, and the upper door panels 24 and 32 continue downward, allowing the doors to nest or telescope together.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

What is claimed is:

1. An apparatus comprising:
   a frame defining a work area;
   a front door assembly movable within said frame;
   a front door assembly track disposed within said frame, said front door assembly movable along said front door assembly track;
   a drive mechanism disposed along said frame, said drive mechanism in mechanical communication with said front door assembly, said drive mechanism operable to position said front door assembly in a plurality of positions along said front door assembly track;
   a rear door assembly and a rear door assembly track disposed within said frame, said rear door assembly movable along said rear door assembly track; and
   wherein said front door assembly is capable of being positioned beneath a welding fixture within said work area thereby allowing full frontal access to said welding fixture within said work area and full overhead access to said welding fixture within said work area.

2. The apparatus of claim 1 further comprising a splatter shield disposed within said work area, wherein when said front door assembly is positioned beneath the welding fixture in said work area and, said front door assembly is beneath said splatter shield.

3. The apparatus of claim 1 wherein said front door assembly comprises an upper front door panel and a lower front door panel, wherein in one position a bottom portion of said upper front door panel overlaps an upper portion of said lower front door panel.

4. The apparatus of claim 3 wherein in another position said upper front door panel nests on top of said lower front door panel.

5. The apparatus of claim 3 further comprising a plurality of rollers disposed between said front door assembly and said front door assembly track, and wherein said front door assembly is movable along said front door assembly track by way of said plurality of rollers.

6. The apparatus of claim 3 further comprising a spacer block between said upper front door panel and said lower front door panel of said front door assembly.

7. The apparatus of claim 1 wherein said rear door assembly comprises an upper rear door panel and a lower rear door panel and a plurality of rollers disposed between said rear door assembly track and said rear door assembly, and wherein said rear door assembly is movable along said rear door assembly track by way of said plurality of rollers.

8. The apparatus of claim 1 wherein when said front door assembly is in a position preventing frontal access to said work area, said rear door assembly is in a position allowing rear access to said work area.

9. The apparatus of claim 8 wherein when said front door assembly is in a position allowing frontal access to said work area, said rear door assembly is in a position preventing rear access to said work area.

10. The apparatus of claim 1 wherein said drive mechanism comprises a first motor coupled to a first flexible connection device, said first flexible connection device in mechanical communication with said front door assembly.

11. The apparatus of claim 10 wherein said first flexible connection device is selected from the group consisting of a chain, a cable and a belt.

12. The apparatus of claim 3 further comprising at least one window in said upper front door panel.

13. The apparatus of claim 1 further comprising at least one stop in said front door assembly track.

14. The apparatus of claim 1 wherein said rear door assembly comprises an upper rear door panel and a lower rear door panel, wherein in one position a bottom portion of said upper rear door panel overlaps an upper portion of said lower rear door panel.

15. The apparatus of claim 14 wherein in another position said upper rear door panel nests along side of said lower rear door panel.

* * * * *